United States Patent
Wang et al.

(10) Patent No.: US 8,352,319 B2
(45) Date of Patent: Jan. 8, 2013

(54) GENERATING USER PROFILES

(75) Inventors: Xuefu Wang, Los Altos, CA (US);
Sarah Sirajuddin, Sunnyvale, CA (US);
Oren E. Zamir, Los Altos, CA (US);
Aitan Weinberg, New York, NY (US)

(73) Assignee: Google Inc., Mountain View, CA (US)

( * ) Notice: Subject to any disclaimer, the term of this patent is extended or adjusted under 35 U.S.C. 154(b) by 724 days.

(21) Appl. No.: 12/401,345

(22) Filed: Mar. 10, 2009

(65) Prior Publication Data
US 2010/0235241 A1    Sep. 16, 2010

(51) Int. Cl.
*G06Q 30/00* (2012.01)

(52) U.S. Cl. .................................... 705/14.53
(58) Field of Classification Search .............. 705/7.29, 705/14.53
See application file for complete search history.

(56) References Cited

U.S. PATENT DOCUMENTS

| | | | |
|---|---|---|---|
| 5,848,396 A | 12/1998 | Gerace | |
| 6,421,675 B1 | 7/2002 | Ryan et al. | |
| 6,839,680 B1 | 1/2005 | Liu et al. | |
| 7,330,828 B2 | 2/2008 | Schoder et al. | |
| 7,734,632 B2 | 6/2010 | Wang | |
| 7,904,448 B2 | 3/2011 | Chung et al. | |
| 2002/0111994 A1 | 8/2002 | Raghunandan | |
| 2003/0074252 A1* | 4/2003 | Chandler-Pepelnjak et al. | 705/10 |
| 2004/0024777 A1 | 2/2004 | Schaffer | |
| 2005/0021397 A1 | 1/2005 | Cui et al. | |
| 2005/0131762 A1 | 6/2005 | Bharat et al. | |
| 2005/0222989 A1 | 10/2005 | Haveliwala et al. | |
| 2005/0288954 A1 | 12/2005 | McCarthy et al. | |
| 2007/0011039 A1 | 1/2007 | Oddo | |
| 2007/0061195 A1 | 3/2007 | Liu et al. | |
| 2007/0239680 A1 | 10/2007 | Oztekin et al. | |
| 2008/0103897 A1 | 5/2008 | Flake et al. | |
| 2008/0126176 A1 | 5/2008 | Iguchi | |
| 2008/0154717 A1 | 6/2008 | Saifee et al. | |
| 2008/0209350 A1 | 8/2008 | Sobotka et al. | |
| 2008/0306830 A1 | 12/2008 | Lasa et al. | |
| 2009/0216616 A1 | 8/2009 | Wang et al. | |
| 2010/0125505 A1 | 5/2010 | Puttaswamy | |
| 2011/0161331 A1 | 6/2011 | Chung et al. | |

FOREIGN PATENT DOCUMENTS

WO    WO2005065229 A2    7/2005

OTHER PUBLICATIONS

"Seagram Spirits and Wine Taps CentrPort to Strengthen E-Marketing Strategy." PR Newswire Dec. 17, 2001 Business Dateline, ProQuest. Web. Aug. 13, 2012.*
U.S. Appl. No. 12/402,436, filed Mar. 11, 2009, Nick Jakobi et al.
International Search Report from International Application No. PCT/US10/26789 mailed Apr. 20, 2010, 2 pages.

(Continued)

*Primary Examiner* — Seye Iwarere
(74) *Attorney, Agent, or Firm* — Fish & Richardson P.C.

(57) ABSTRACT

Methods, systems, and apparatus, including computer program products, for generating user identifier profiles. A user identifier profile characterizes a user based on events that occurred during past user sessions for a user (e.g., past online activities). An event is an action that occurs during a user session, such as a web page view, an advertisement click-through, and a conversion. A user identifier profile can be used, for example, to select advertisements targeted to the user. A user identifier profile includes information about inferred user interests and inferred user demographics.

20 Claims, 5 Drawing Sheets

OTHER PUBLICATIONS

"Veoh Launches New Behavioral Targeting Solution for Online Video Ads and Branded Content", http://www.veoh.com/static/corporate/press_releases/07_14_2008.html; Veoh Networks, dated Jul. 14, 2008.

Kazienko et al. (2007). AdROSA-Adaptive personalization of web advertising. Information Sciences 177, pp. 2269-2295.

Montaner et al. (2003) A Taxonomy of Recommender Agents on the Internet. Artificial Intelligence Review 19, pp. 285-330.

Gauch et al. (2007) The Adaptive Web, LNCS., User Profiles for Personalized Information Access, pp. 54-89, Springer-Veriag Berlin Heidelberg.

International Preliminary Report on Patentability from International Application No. PCT/US10/26789 mailed Sep. 22, 2011, 7 pages.

\* cited by examiner

GENERATING USER PROFILES

BACKGROUND

This specification relates to providing digital content.

The Internet provides access to a wide variety of content items, e.g., video and/or audio files, web pages for particular subjects, news articles, etc. Such access to these content items has likewise enabled opportunities for providing targeted content, such as advertisements. For example, upon granting permission to track a user's online activities (e.g., the user opts-in to allow the user's online activities to be tracked), the activities can be used to generate a user profile for the user. Content, such as advertisements, can be targeted to the user by selecting the content based on the user's user profile.

However, such user profiles may not take into account the user's short term and long term interests. Additionally, the user profile may not be modeled to reflect demographics that are relevant to the user and the user's interests in various categories.

SUMMARY

Disclosed herein are systems and methods that infer user profiles that are based on user interests and user demographics. The user interests are inferred from events, i.e., actions that occur during user sessions, such as web page views, advertisement click-throughs, and conversion, to name just a few. The user demographics are inferred from the demographics of the web sites the user visited during the user's online activities.

In general, one aspect of the subject matter described in this specification can be embodied in methods that include identifying event data for a user identifier based on past user sessions associated with the user identifier, the event data specify events that occurred during the past user sessions; categorizing each of the events as belonging to one or more vertical categories; for each vertical category, determining a user identifier interest weight for the user identifier based on the events associated with the vertical category; generating user identifier demographics data for the user identifier based on population demographics for each site visited during the past user sessions as specified by the event data, the population demographics for each site identifying one or more demographic features of visitors to the site; generating user identifier profile data for the user identifier based on the user identifier interest weights and the user identifier demographics data; and selecting advertisements for user sessions associated with the user identifier based on the user identifier profile data. Other embodiments of this aspect include corresponding systems, apparatus, and computer program products.

Particular implementations of the subject matter described in this specification can be implemented to realize one or more of the following advantages. User interests are inferred from events that describe user actions for various categories.

Demographic that are relevant to the user are inferred from the known demographics of web sites that the user previously visited. Thus, a user need not explicitly specify that particular interests or particular demographic features to have associated user interests and demographics. Furthermore, the user need not even belong to a particular demographic to be associated with the demographic. For example, a user that belongs to a demographic of 18-25 year old males may nevertheless visit web sites that are heavily trafficked by 45-55 year old males. Accordingly, the user may be associated with the 45-55 year old male demographic.

The user profiles can be generated on a per-publisher basis, or on a network of publishers basis.

Both short term profiles and long term profiles can be generated, and the short term profiles can be used to re-rank content that is selected based on the long term profiles to ensure that content that is of must current interest to the user is presented.

Content, such as advertisements, can be selected for showing to the user based on the user's inferred interests and demographics based on the user's behavior. The user's behavior is less subject to biases that may be present when users list their own interests in profiles.

Each of these advantages are optional, and need not be realized in any particular implementation.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

In general, the subject matter of this specification relates to generating user profiles for user identifiers, which are identifiers identifying particular users. A user profile can be generated based on inferred user interests and inferred user demographics. The inferred user interests and demographics can be derived from events that occurred during the user's online activities. An event is an action that occurs during a user session, such as a web page view, an advertisement click-through, and a conversion, and indicative of a user interest (or lack of interest) in a vertical category.

The user interests for a user can be inferred from the subject matter of vertical categories (e.g., cars, finance, sports, etc.) to which the events of that user's online activities belong. Additionally, the level of activity as measured by the number of events belonging to a given vertical category can also be used to measure a level of user interest.

The user demographics for a user can be inferred from the demographics of the sites the user visited during the user's online activities. Each inferred demographic, e.g., gender, age, household size, etc., can be determined based on an aggregation of the known demographic features from the sites visited by the user.

The user profile for a user identifier is constructed from the inferred user interests and inferred user demographics, and is used to target advertisements to users sessions associated with the user identifier. In some implementations, long-term user profiles (e.g., user profiles based on events that occurred during the previous twenty-four hours or longer) can be generated and used to select a set of candidate advertisements and short-term user profiles (e.g., user profiles based on events that occurred during the previous hour) can also be generated and used to adjust the ranking of the set of candidate advertisements. Advertisements that are presented for a user session are selected from the adjusted set of candidate advertisements.

§1.0 Example Operating Environment

Figure 1:
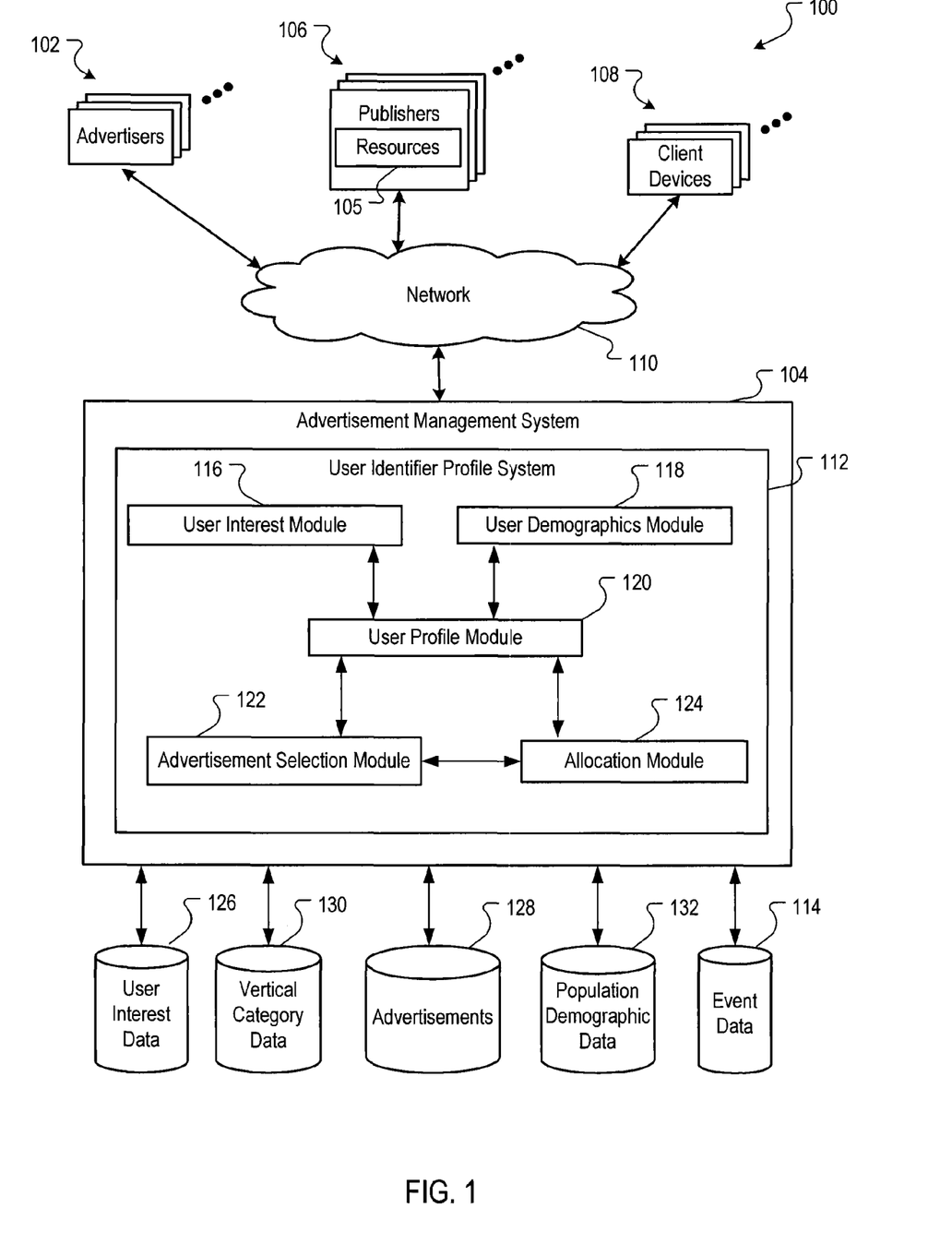
FIG. 1 is a block diagram of an example environment in which a user identifier profile system can be implemented.

FIG. 1 is a block diagram of an example environment 100 in which a user identifier profile system 112 can be implemented. The online environment 100 can facilitate the identification and serving of web content, e.g., web pages, advertisements, etc., to users. A computer network 110, such as a local area network (LAN), wide area network (WAN), the Internet, or a combination thereof, connects advertisers 102, an advertisement management system 104, publishers 106, and client devices 108. The online environment 100 may include numerous advertisers 102, publishers 106 and client devices 108.

One or more advertisers 102 can directly, or indirectly, enter, maintain, and track advertisement information in the advertising management system 104. The advertisements can be in the form of graphical advertisements, such as banner advertisements, text only advertisements, image advertisements, audio advertisements, video advertisements, advertisement gadgets with or without interactive features, advertisements combining one of more of any of such components, etc., or any other type of electronic advertisement document. The advertisements may also include embedded information, such as a links, meta-information, and/or machine executable instructions, such as HTML or JavaScript™.

A publisher 106 is any web site that hosts and provides electronic access to a resource (e.g., web page content) by use of the network 110. A web site is one or more resources 105 associated with a domain name. An example web site is a collection of web pages formatted in hypertext markup language (HTML) that can contain text, graphic images, multimedia content, and programming elements, such as scripts.

A resource is any data that can be provided by the publisher 106 over the network 110 and that is associated with a resource address. Resources include HTML pages, word processing documents, and portable document format (PDF) documents, images, video, and feed sources, to name just a few. The resources can include content, such as words, phrase, pictures, videos, and so on, and may include embedded information (such as meta information and hyperlinks) and/or embedded instructions (such as JavaScript scripts).

A client device 108 is electronic device that is under the control of a user and is capable of requesting and receiving data over the network 110. A client device 108 typically includes a user application, such as a web browser, to facilitate the sending and receiving of data over the network 110, such as requesting a resource (e.g., page content) from a publisher 106. Example client devices 108 include personal computers, mobile communication devices, and other devices that can send and receive data over the network 110.

Publishers 106 can submit advertisement requests for one or more advertisements to the system 104. The system 104 responds by sending the advertisements to the requesting publisher 106 for provisioning with one or more of the publisher's resources. Alternatively, the system 104 responds by sending the advertisement directly to a client device 108 in response to the client device request for a resource from a publisher 106, typically via embedded instructions received by the client device 108 from the publishers 106.

The advertisements can include embedded links to landing pages, i.e., pages on the advertisers 102 websites that a user is directed to when the user clicks an advertisement presented on a publisher 106 website. The advertisement requests can also include resource request information. This information can include the resource itself (e.g., web page), a category corresponding to the resource (e.g., arts, business, computers, arts-movies, arts-music, etc.), part or all of the resource request, resource age, resource type (e.g., text, graphics, video, audio, mixed media, etc.), geo-location information, etc.

§2.0 User Identifier Profile System

The advertisement management system 104 includes a user identifier profile system 112. The user identifier profile system 112 generates user identifier profiles for users based on inferred interests and demographics. The interests and demographics for a user can be inferred from the events that occurred during the user's past user sessions and the web content associated with the events.

Past user sessions for a user can be identified in various ways. For example, a user account for a user (e.g., a user account for a search engine or other network system) can be used to identify past user sessions for the user. Each user account can be keyed to a user identifier that is uniquely associated with a user, and the user identifier is also associated with past user sessions for its account. Such an account-based user session begins with the user logging into the user account and is maintained until the user logs out of the account. Upon granting permission to track the user's history (e.g., the user opts-in to allow the user's online activities to be tracked), historical data for the user's sessions and other user data are tracked and associated with the user identifier. At the user's option, only data approved by the user are tracked (e.g., if the account is for a search engine, the user may specify that only search queries and search result selections are tracked). The user can clear all historical data associated with the user account at any time, and can opt-out of such tracking at any time. Further, to protect the privacy of the user, the historical data can be anonymized so that the data cannot be associated with the user.

In some implementations, past user sessions for a particular user can also be identified based on an identifier associated with the client device 108 used by the user. For example, the IP address of the client device 108 can be used to infer a past user session for the user (e.g., the IP address of the client device 108 can be included in a request for information from a publisher).

In some implementations, upon a user granting permission, past user sessions can further be identified by access to and use of a data file stored on a client device 108. For example, a cookie stored on a client device 108 can be used to identify the client device 108 and access information about past online activities facilitated by the client device 108.

The events, and information associated with the events, that occurred during the past user sessions for the users can be stored in an event data store 114. For example, the event data store 114 can store data about events such as advertisement click-throughs, web page views, conversions, user searches, and video views, to name just a few. The data in the event data store 114 can be partitioned, for example, according to users or user identifiers.

§2.1.0 User Interest Module

The user identifier profile system 112 can include a user interest module 116. The user interest module 116 can determine user interests for users in particular vertical categories. For each vertical category, the user interest in the vertical category can be determined based on the events related to the vertical category that occurred during the past user sessions. The user interest module 116 can categorize each of the events as belonging to one or more vertical categories based on the subject matter associated with the event and subject matter associated with the vertical categories. For example, a web page view event for a web page categorized in a sports vertical category can be categorized as belonging to the sports category vertical.

To facilitate the categorization process the user interest module 116 can access vertical category data from the vertical category data store 130. The vertical category data 130 stores data that categorizes web content according to the subject matter of the web content. For example, web pages that provide movie related information can be categorized in the entertainment/movies vertical category.

Web content can also be categorized in more than one vertical category. For example, a sports news web page may have a majority of its content directed to current events of different sports. However, the sports news web page may also include an abbreviated listing of a few sports-related programs. As such the sports news web page may be categorized in both a sports vertical category and an entertainment/TV/TV programs vertical category.

Likewise, advertisements and their associated landing pages can also be categorized in the vertical categories, and the categorization can be stored in the vertical category data 130.

The user interests for a user can be inferred from the subject matter of vertical categories to which the events of that user's online activities belong. The amount of activity as measured by the number and types of events for a user belonging to a given vertical category can be used to gauge the level of the user's interest in the vertical category.

The number of events for a user that occurred during the past user sessions in the same vertical category can be used as a measure of user interest in the vertical category. For example, if a first user has ten page views of web pages categorized in a sports vertical category during the past week and a second user has only one page view of web pages categorized in the sports vertical category during the same time period then it can be inferred that the first user has a stronger interest than the second user in the subject matter of the sports vertical category. As such, the interest for a user in a particular vertical category can be based on a weighted scheme, as determined by events that occurred during past users sessions for the user ("user identifier interest weight").

§2.1.1 Example Interest Weight Calculation

In some implementations, the user identifier interest weights for a user in vertical categories that categorize web pages that were viewed, advertisements that were clicked/selected, or landing pages that were visited can be determined according to, for example, Equation 1:

$$\sum_{\in event\_data} (W(P) * IDF + W(AC) + W(AL) * CW + W(AL) * CVW) \quad (1)$$

For any given time period (e.g., duration during which a set of past user sessions occurred) and a particular user identifier, Equation 1 provides a list of vertical categories and respective user identifier interest weights in those vertical categories.

P represents the vertical categories categorizing the web pages the user has viewed. W(P) is a weight of a vertical category for a web page. The weight of a vertical category for a web page (or any other web content) is determined by the extent of the web page's content directed to the subject matter of the vertical category. As noted above, a sports news web page may be categorized in both a sports vertical category and an entertainment/TV/TV programs vertical category. As the content of the sports news web page is dominated by the current events portion, the weight for the sports vertical category will be higher relative to the weight for the entertainment/TV/TV programs vertical category. For example, based on a normalized scheme, the weight for the sports vertical category for the sports news web page may be 0.8 and the weight for the entertainment/TV/TV programs vertical category may be 0.2.

Many different types of weighting algorithms can be used to determine the weight of a vertical category for a web page. For example, term clustering can be used to identify terms that are clustered according to various categories, and the number of terms in each cluster and the total number of terms in a page can be used to determine the weights.

IDF is the inverse document frequency for a web page based on the number of visitors that have visited the web page. IDF is inversely proportional to the number of visitors. Thus if a first web page has only a few visitors the IDF for that web page will be higher than the IDF for a second web page that has more visitors than the first web page.

AC represents the vertical categories categorizing the advertisements of the advertisement click-throughs. W(AC) is a weight of a vertical category for an advertisement. W(AC) is determined in a manner similar to W(P) but in relation to the content of an advertisement rather than a web page.

AL represents the vertical categories categorizing the landing pages of the advertisements. W(AL) is a weight of a vertical category for a landing page. W(AL) is determined in a manner similar to W(P) but in relation to the content of the landing page rather than a web page.

CW is a weight of the click duration associated with an advertisement click-through (e.g., the longer the click, the higher the weight of the click duration). A length of a click can be measured based on how long a session dwells on the landing page after a click and on clicks on additional links that are present on the landing page.

CVW is a weight associated with a conversion. In some implementations, the weight is the same for all conversions. In other implementations, the weight is proportional to a magnitude of the conversion if a magnitude can be measured, e.g., a price associated with a purchase.

To illustrate how a user interest weight in a vertical category is determined, Equation (1) will be applied to the values shown in Table 1. Table 1 shows exemplary event data for a user that occurred during three past user sessions in a vertical category 1:

TABLE 1

| | Web page view/IDF/W(P) | Ad click-throughs/ W(AC)/W(AL)/CW | Conversions/ CVW |
|---|---|---|---|
| Past user ses. 1 | Web page A/0.5/0.4 | | |
| Past user ses. 2 | Web page B/0.7/0.6 | Ad X/0.3/0.8/0.2 | Ad X/0.3 |
| Past user ses. 3 | Web page A/0.5/0.4 | Ad Y/0.9/0.5/0.1 | |

A user identifier interest weight for the user in vertical category 1 can be generated by processing the event data shown in Table 1, and the associated information, by use of Equation 1, as shown Table 2:

TABLE 2

|  | Web page weight | Ad click-through weight | Conversion weight |
| --- | --- | --- | --- |
| Web page A | W(P) * IDF = .4 * .5 = .2 | | |
| Web page B | W(P) * IDF = .6 * .7 = .42 | | |
| Ad X | | W(AL) * CW = .8 * .2 = .16 | W(AL) * CVW = .8 * .3 = .24 |
| Ad Y | | W(AL) * CW = .5 * .1 = .05 | |

The web page weight for web page A is 0.4 (2*0.2), as it was viewed during both past user session 1 and 3, the web page weight for web page B is 0.42, the ad click through weight for ad X is 0.16, the conversion weight for ad X is 0.24, and the ad click-through weight for ad Y is 0.05. Thus According to Equation 1, the user identifier interest weight in vertical category 1 is 2.47:

$$(W(P)*\text{IDF})_{web\,page\,A}+(W(P)*\text{IDF})_{web\,page\,B}+\\(W(AC)_{adX}+(W(AC)_{adY}+(W(AL)*CW)_{adX}+\\(W(AL)*CW)_{adY}+(W(AL)*CVW)_{adX}=0.4+0.42+\\0.3+0.9+0.16+0.05+0.24=2.47$$

The user identifier interest weights can be stored in the user interest data store 126.

In some implementations, the user identifier interest weights can be normalized relative to the average user interest weight in the vertical category. Such normalization facilitates a comparison of user identifier interest weights between vertical categories. For example, a particular user may have a raw user identifier interest weight of 1.5 in a first vertical category and a raw user identifier interest weight of 1.2 in a second vertical category. The average user identifier interest weight in the first vertical category is 1.6 and the average user identifier interest weight in the second vertical category is 0.3. Thus the user has a less than average user identifier interest weight in the first vertical category and a more than average user identifier interest weight in the second vertical category, even though the user's raw weight in the first vertical category is greater than the user's raw weight in the second vertical category.

Although Equation 1 relies on only the web pages viewed, the advertisements clicked, and conversions to determine the user interest weights, other event data can also be used such as user searches, video views, online purchases, etc. Additionally, methods other than that described by Equation 1 can be used to generate the user identifier interest weights.

§2.1.2 Selecting Top Vertical Categories For Profile

In some implementations, only a subset of all vertical categories for which a user has a user identifier interest weight is used in the generation of the user identifier profile. For example, the top N vertical categories ("highest ordered subset" of vertical categories) based on user identifier interest weights is selected for use in the generation of the user identifier profile. In some implementations, the top N vertical categories for a user identifier are selected based on a function of the magnitude of the interest weights in the top N vertical categories and a function of the interest weights in the top N vertical categories relative to the interest weights of vertical categories outside the top N vertical categories, as shown by Equation 2:

$$UI[1]/UI[n]<X \text{ and } (UI[n]/UI[n+1])>Y \qquad (2)$$

where U[x] is a user interest weight in a vertical category. In particular, UI[1] is the user identifier interest weight in the vertical category with the highest user identifier interest weight and UI[n] is the user identifier interest weight in the vertical category with the nth highest user identifier interest weight. Thus the sequence UI[1], UI[2] . . . UI[n] corresponds to a set of vertical categories, 1 through n, ordered according to the user identifier interest weights of the vertical categories.

The number of vertical categories in the set can be determined by thresholds. For example, X can be a first threshold and Y can be a second threshold, and only the set of vertical categories satisfying these thresholds are used in the user identifier profile. The user interest module 116 selects a set of vertical categories that satisfy the thresholds.

The first threshold X defines an upper limit for a quotient of the user identifier interest weight of a first-ordered vertical category in the subset (i.e., the vertical category with the highest user identifier interest weight—UI[1]) and the user identifier interest weight of a last-ordered vertical category in the subset (i.e., the vertical category having the lowest user interest weight that satisfies the first and second thresholds). Thus the first threshold can be used to identify a set of vertical categories having user identifier interest weights that are similar in magnitude.

The second threshold Y defines a lower limit for a quotient of the user identifier interest weight of the last-ordered vertical category and the user identifier interest weight of a next-ordered vertical category external to the subset, i.e., the vertical category having the next lowest user identifier interest weight relative to the last-ordered vertical category. Thus the second threshold can be used to identify a significant change (e.g., an abrupt drop-off) between the user identifier interest weights of two vertical categories (e.g., the last-ordered vertical category and the next-ordered vertical category).

§2.2 User Demographics Module

The user identifier profile system 112 can include a user demographics module 118. The user demographics module 118 can generate user identifier demographics data for the user based on population demographics for each site the user visited during the user's past user sessions, as specified by the event data. The population demographics for each site identify one or more demographic features of visitors to the site. The population demographics can be obtained, for example, from the various websites (e.g., publishers 106) visited by the user during the past user sessions. The population demographics can be stored in a population demographics data store 132. Demographic features may include geographic location, age, gender, income range, household income range, size of household, maximum educational attainment, children in the household, etc.

In some implementations, the user identifier demographics for a user can be determined, in part, by aggregating the population demographics for each of the visited sites, for example, according to Equation 3:

$$\sum_{\in all\_websites} w(\text{feature}_{ij}) \qquad (3)$$

where w(feature$_{ij}$) is a weight of a particular value j (e.g., male or female) of a feature i (e.g., gender) from a website.

For example, a user may have visited two sites, site A and site B, during the user's past user sessions. It is known that sixty-five percent of the visitors visiting site A are male and thirty-five percent are female, and eighty percent of the visitors visiting site B are male and twenty percent are female (e.g., population demographics). In some implementations, the percentages can be considered weights (e.g., 65% equates to a weight of 0.65). According to Equation 3, the value weights for the gender feature are 0.65 (male visitors at site A)+0.80 (male visitors at site B)=1.45, and 0.35 (female visitors at site A)+0.20 (female visitors at site B)=0.55. The demographics for sites A and B both indicate that males are more likely then females to visit the sites (e.g., 1.45>0.55). Thus it can be inferred that the user is a male.

In some implementations, population demographics associated with advertisements clicked by the user can also be used to infer user identifier demographics. However, other methods can also be used to infer user identifier demographics from the population demographics (e.g., weighting population demographics from certain sites based on website traffic).

§2.3 User Profile Module

The user identifier profile system 112 can include a user profile module 120. The user profile module 120 can generate user identifier profile data for the user based on the user identifier interest weights and the user identifier demographics data.

In some implementations, the user profile module 120 can operatively control the user interest module 116 and the user demographics module 118 to generate long-term user identifier profile data and short-term user identifier profile data. Long-term user identifier profile data are derived from event data that are based past user sessions that occurred during a first time period. The short-term user identifier profile data are derived from the event data that are based on past user sessions that occurred during a second time period where the second time period is the most recent sub-period of the first time period. For example, if the first time period is the last twenty-four hours (in relation to a current user session), then the second time period can be the most recent hour. The first and second time periods are not limited to any particular duration; rather the defining characteristic is that the second time period is the most recent portion of the first time period. Accordingly, the event data used to generate the short-term user identifier profile data will be a subset of the event data used to generate the long-term user identifier profile data.

In some implementations, the user profile module 120 can generate user identifier profile data for only the event data associated with a particular website, publisher or publisher network (e.g., a group of websites or domains). For example, if the event data for a user includes events associated with resources of publishers A and B, the user profile module 120 can generate user identifier profile data based on only the events associated with the resources of publisher A, or user identifier profile data based on only the events associated with the resources of publisher B, or user identifier profile data based on a combination of the events associated with the resources of publisher A and publisher B.

§2.4 Advertisement Selection Module

The user identifier profile system 112 can include an advertisement selection module 122. The advertisement selection module 122 can select advertisements for user sessions (e.g., current user sessions) of a user based on the user identifier profile data for that user. For example, if a user's user identifier profile data indicates that the user has a high user identifier interest weight in a vertical category (e.g., as compared to other users) then the advertisement selection module 122 can account for such interest when selecting, ranking, and/or ordering advertisements (e.g., select advertisements categorized in the vertical category corresponding to the high user identifier interest weight). The advertisement selection module 122 can select advertisements from the advertisement data store 128.

In some implementations, the advertisement selection module 122 can select a candidate advertisement set based on the long-term user identifier profile data and/or adjust the ranking of the candidate advertisement set based on the short-term user identifier profile data. For example, the advertisement selection module 122 can use the long-term profile data (which can be periodically generated in an offline process) to select and initial set of advertisements based on past user sessions occurring during the previous two days and then use the short-term profile data (which can be generated in a real-time or near real-time process) to adjust, e.g., tweak, the ranking of the advertisements in the candidate set based on past user sessions occurring during the previous hour. The use of the short-term user identifier profile data permits the advertisement selection module 122 to take into account only the user's recent events. Without the short-term user identifier profile data the interest indicated by these recent events may be overshadowed when viewed in the context of all of the events occurring over the last two days, as reflected in the long-term user identifier profile data. In some implementations, the advertisement selection module 122 can use only the long-term user identifier profile data or only the short-term user identifier profile data, i.e., the long-term user identifier profile data and the short-term user identifier profile data can be used separately.

The highest ranked advertisements can be provided for presentation for a user session associated with the user identifier profile data used to select the advertisements. In some implementations, the user identifier profile data can be used with other advertisement selection techniques. For example, advertisements for presentation on a publisher page may be selected a certain percentage of the time based on the user identifier profile data, and may be selected at other times based solely on the content of the publisher page.

§2.5 Allocation Module

The user identifier profile system 112 can include an allocation module 124. The allocation module 124 can allocate consideration (e.g., profits or revenue) from advertisement auctions based on publisher data contributions to the event data. The more event data that is used to generate user identifier profile data the more complete that user identifier profile data will be. In some implementations, publishers can opt-in and elect to share event data. Conversely, publishers can also opt-out and elect not to share event data. To encourage publishers to share event data, the allocation module 124 can attribute auction profits or revenue to publishers in proportion to the amount of event data that a particular publisher has contributed.

The amount of the profits allocated to a particular publisher can be based on, for example, Equation 4:

$$R*P*Q*T[j] \tag{4}$$

Where:

R is the revenue paid by the auction-winning advertiser;

P is the publisher revenue share percentage (e.g., sharing publishers collectively receive 10% of the revenue);

Q quantifies the extent to which the user identifier profile data was used to select the advertisement; and T[j] is a publisher data contribution factor for a publisher that quantifies the contribution of a publisher to the event data used to generate the user identifier profile data.

For example, if twenty factors used to select the advertisement (e.g., the amount of the advertisement bid, the advertisement's click through rate, etc.) and the user identifier profile data was one factor then Q would be 1/20=5%. If the revenue paid by the auction winning advertiser is $3.00, the publisher revenue share percentage is 20%, Q is 25%, and the publisher data contribution factor is 75% (e.g., the publisher provided 75% of the event data used to generate the user identifier profile) then the publisher would receive $3.00*0.2*0.25*0.75=$0.11.

Other models or methods can be used to allocate the revenue to sharing publishers based on the publishers' contributions to the event data.

§3.0 Example Process Flows

Figure 2:
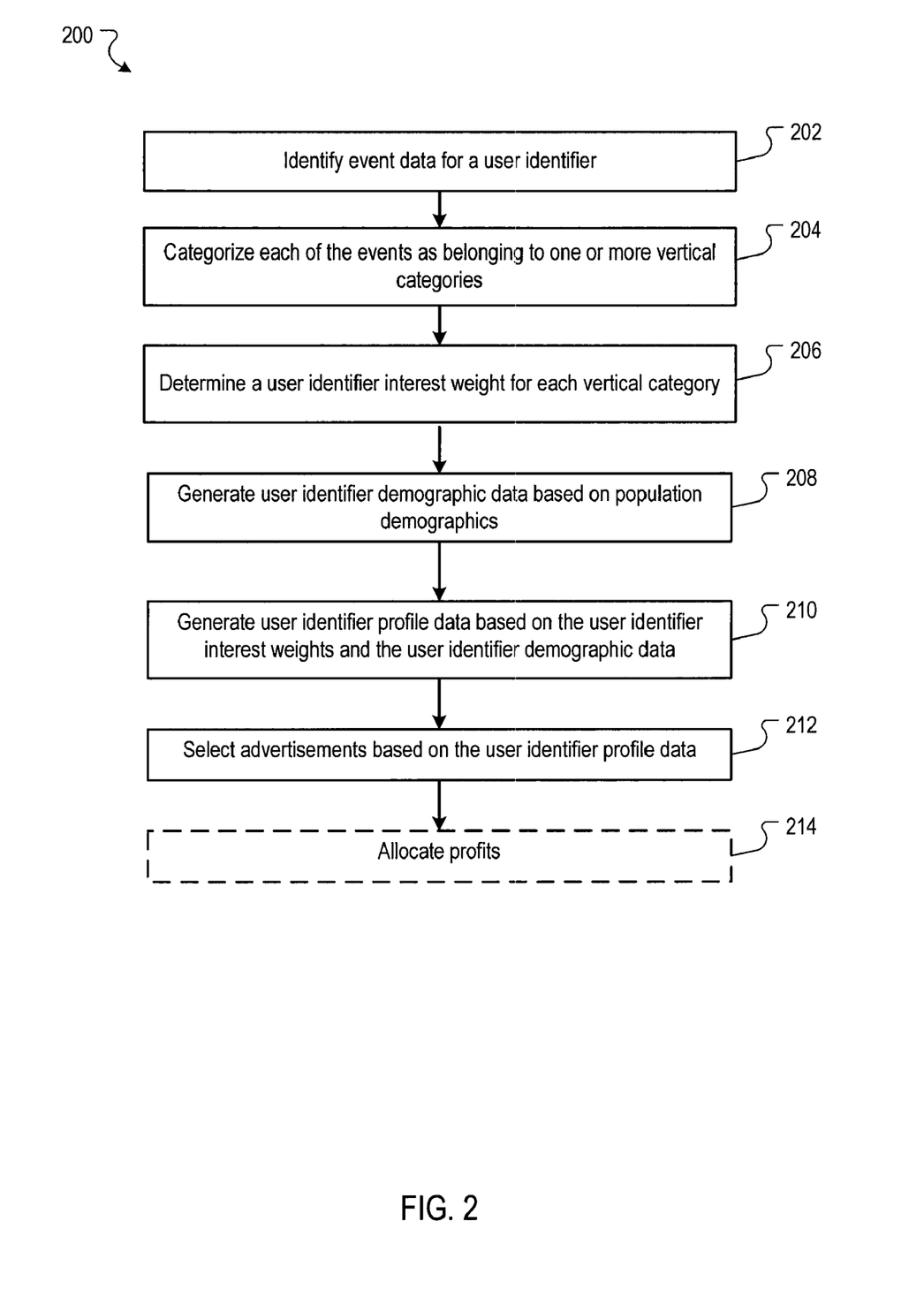
FIG. 2 is a flow chart of an example process for selecting advertisements based on user identifier profile data.

FIG. 2 is a flow chart of an example process 200 for selecting advertisements based on user identifier profile data. The process 200 can, for example, be implemented in the advertisement management system 104.

Event data for a user identifier is identifier based on past user sessions associated with the user identifier (202). The event data specify events that occurred during the past user sessions. For example, the user interest module 116 can identify event data for a user identifier from historical data associated with user sessions for that user identifier.

Each of the events is categorized as belonging to one or more vertical categories (204). For example, the user interest module 116 can categorize events as belonging to one or more vertical categories based on the categories associated with advertisement click throughs, web page views, and conversions identified in the event data.

A user identifier interest weight for the user identifier is determined based on the events associated with the vertical category (206). For example, the user interest module 116 can determine user identifier interest weights according to Equation 1 above, or by some other algorithm.

User identifier demographics data for the user identifier are generated based on population demographics for each site (208). The population demographics for each site identify one or more demographic features of visitors to the site (e.g., gender, age, etc.). For example, the user demographics module 118 can generate user identifier demographics data for the user identifier based on population demographics for each site by aggregating the demographic features as described above.

User identifier profile data for the user identifier are generated based on the user identifier interest weights and the user identifier demographics data (210). For example, the user profile module 120 can generate user identifier profile data for the user identifier based on the user identifier interest weights and the user identifier demographics data.

Advertisements for user sessions associated with the user identifier are selected based on the user identifier profile data (212). For example, the advertisement selection module 122 can select advertisements for user sessions associated with the user identifier based on the user identifier profile data.

Profits (or revenue) from advertisement auctions associated with the selected advertisements are allocated based on publisher data contributions to the event data (214). The amount of the profits (or revenue) allocated to a publisher is based on the revenue paid by the auction-winning advertiser, a publisher revenue share percentage, and a publisher data contribution factor. For example, allocation module 124 can allocate profits from advertisement auctions according to the allocation formula described above.

Figure 3:
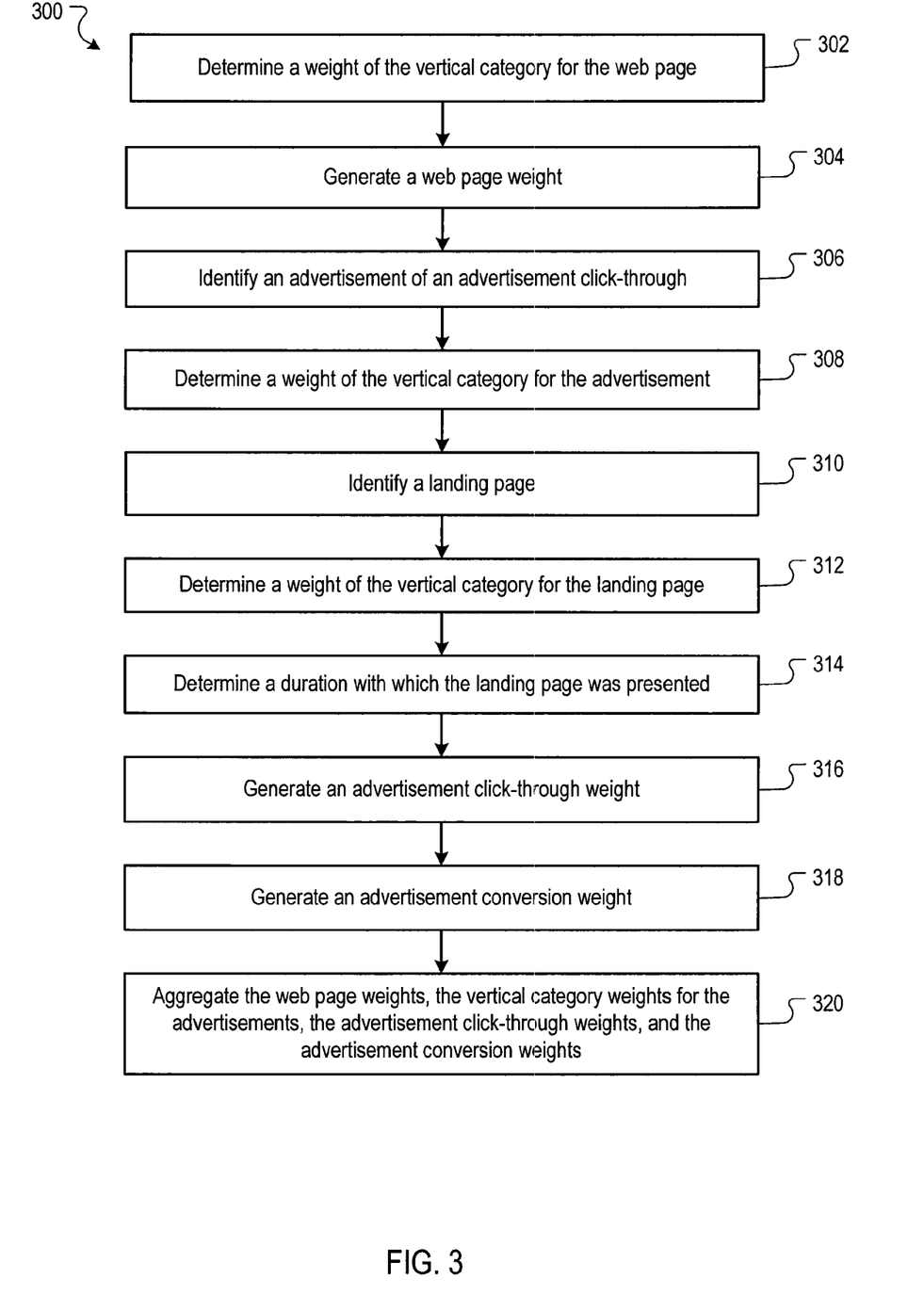
FIG. 3 is a flow chart of an example process for determining user identifier interest weights.

FIG. 3 is a flow chart of an example process 300 for determining user identifier interest weights. The process 300 can, for example, be implemented in the advertisement management system 104.

A weight of the vertical category for the web page is determined (302). The weight of the vertical category can be determined based on the content of the web page directed to the subject matter characterized by the vertical category. For example, the user interest module 116 can determine a weight of the vertical category for the web page based on a comparison of clustered terms to all terms in the web page, or other weighting techniques.

A web page weight is generated based on the weight of the vertical category for the web page and an inverse document frequency of the viewed web page (304). For example, the user interest module 116 can generate a web page weight based on a multiplication of the web page weight and the inverse document frequency.

An advertisement of an advertisement click-through is identified (306). For example, the user interest module 116 can access or receive information from the advertisement management system 104, the advertisers 102 and/or the publishers 106 about the advertisement and the advertisement click-through.

A weight of the vertical category for the advertisement is determined (308). For example, the user interest module 116 can determine a weight of the vertical category for the advertisement in a similar manner as described above.

A landing page of the advertisement is identified (310). For example, the user interest module 116 can access or receive information from the advertisement management system 104, the advertisers 102 and/or the publishers 106 about the landing page.

A weight of the vertical category for the landing page is determined (312). For example, the user interest module 116 can determine a weight of the vertical category for the landing page in a similar manner as described above.

A duration with which the landing page was presented on a user device is determined (314). For example, the user interest module 116 can access or receive information from the advertisement management system 104, the advertisers 102 and/or the publishers 106 about the duration with which the landing page was presented.

An advertisement click-through weight is generated based on the weight of the vertical category for the landing page and the duration (316). For example, the user interest module 116 can generate the advertisement click-through weight based on the duration.

An advertisement conversion weight is generated based on the weight of the vertical category for the landing page and a conversion weight associated with the advertisement (318). For example, the user interest module 116 can generate the advertisement conversion weight based on a measurement associated with a conversion, such as a binary measurement or a weighted measurement based on a conversion price.

The web page weights, the weights of the vertical category for the advertisements, the advertisement click-through weights, and the advertisement conversion weights are aggregated (320). For example, the user interest module 116 can aggregate the web page weights, the weights of the vertical category for the advertisements, the advertisement click-through weights, and the advertisement conversion weights. In some implementations, the aggregated weight can be normalized.

Figure 4:
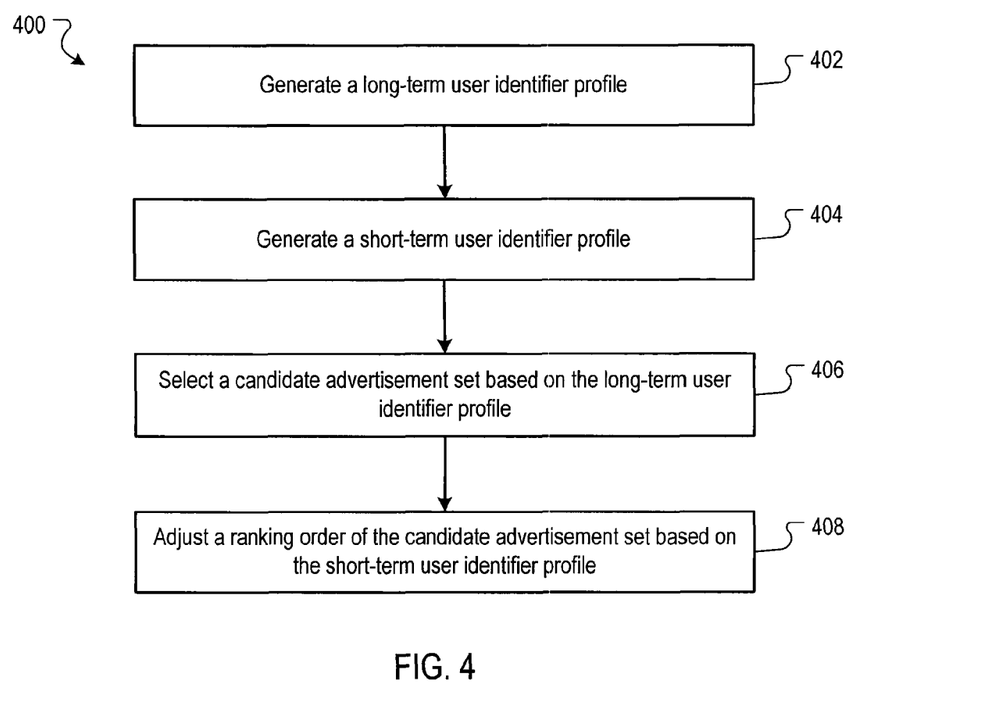
FIG. 4 is a flow chart of an example process for selecting advertisements based on short-term user identifier profile data and long-term user identifier profile data.

FIG. 4 is a flow chart of an example process 400 for selecting advertisements based on short-term user identifier profile data and long-term user identifier profile data. The process 400 can, for example, be implemented in the advertisement management system 104.

Long-term user identifier profile data for the user identifier are generated based on the user identifier interest weights from the event data that are based on past user sessions that occurred during the first time period (402). For example, the user profile module 120 can generate the long-term user identifier profile data based on event data for the first time period.

Short-term user identifier profile data for the user identifier are generated based on the user identifier interest weights from the event data that are based on past user sessions that occurred during a second time period (404). The second time period is a most recent sub-period of the first time period. For example, the user profile module 120 can generate the short-term user identifier profile data.

A candidate advertisement set is selected based on the long-term user identifier profile data (406). For example, the advertisement selection module 122 can select a candidate advertisement set based on the long-term user identifier profile data.

A ranking order of the candidate advertisement set is adjusted based on the short-term user identifier profile data (408). For example, the advertisement selection module 122 can adjust the ranking order of the candidate advertisement set based on the short-term user identifier profile data.

Figure 5:
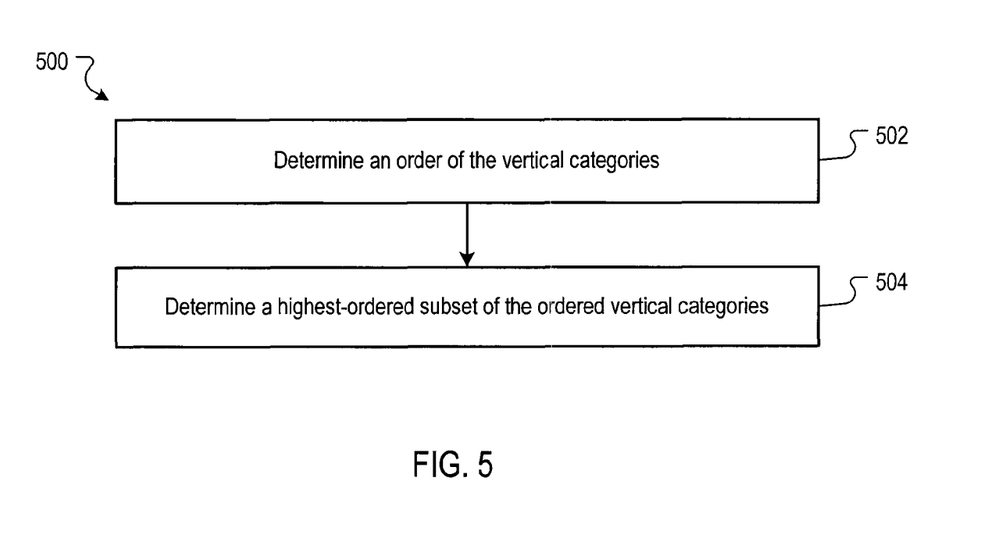
FIG. 5 is a flow chart of an example process for selecting vertical categories for use in generating user identifier profile data.

FIG. 5 is a flow chart of an example process 500 for selecting vertical categories for use in generating user identifier profile data. The process 500 can, for example, be implemented in the advertisement management system 104.

An order of the vertical categories is determined according to the corresponding user identifier interest weights (502). For example, the user profile module 120 can determine an order of the vertical categories based on user identifier interest weights.

A highest-ordered subset of the ordered vertical categories for use in generating the user identifier profile data is determined (504). The highest-ordered subset is based on the corresponding user identifier interest weights, a first threshold and a second threshold. The first threshold defines an upper limit for a quotient of the user identifier interest weight of a first-ordered vertical category in a subset and the user identifier interest weight of a last-ordered vertical category in the subset. The second threshold defines a lower limit for a quotient of the user identifier interest weight of the last-ordered vertical category in the subset and the user identifier interest weight of a next-ordered vertical category external to the subset. In some implementations the highest-ordered subset of vertical categories are the only vertical categories used to generate the user identifier profile data. For example, the user profile module 120 can determine a highest-ordered subset of the ordered vertical categories.

In some implementations, the user identifier profile data can also be used to select content other than advertisements. For example, the user identifier profile data can be used to select content items such as web pages for presentation to a user based on that user's user identifier profile data. Such content items may be presented to the user as snippets of the web page's content (e.g., a snippet of a news article from a news web page).

§4.0 Example Processing System

Figure 6:
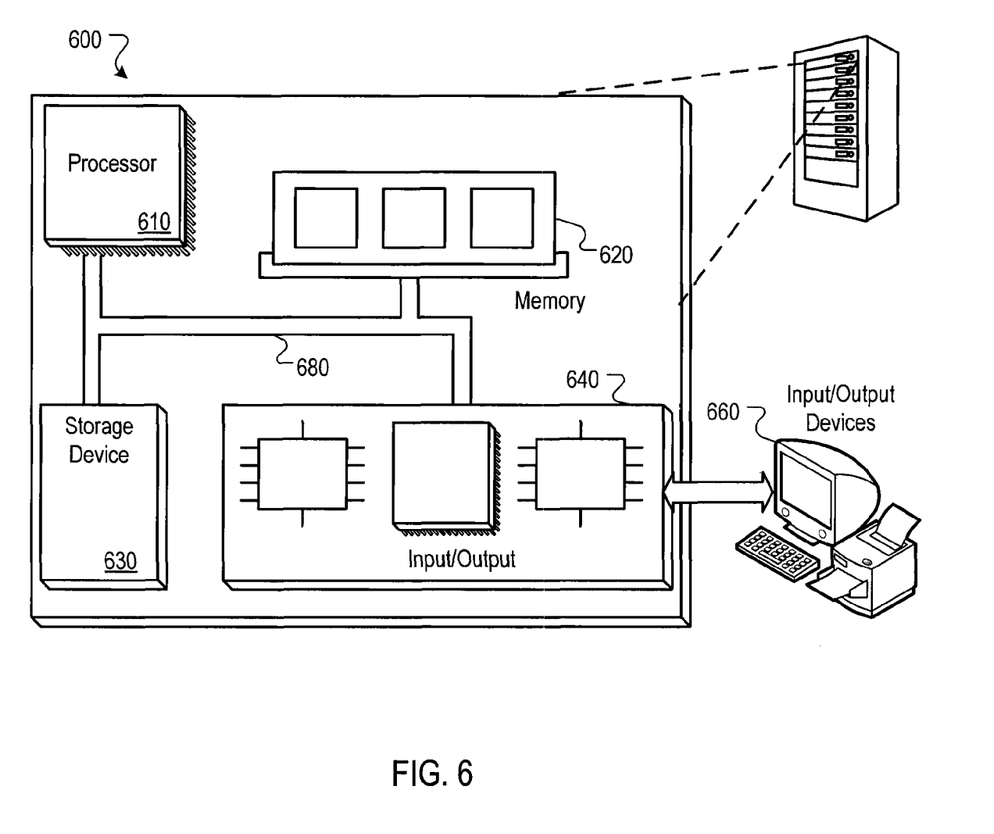
FIG. 6 is a block diagram of an example computer processing system that can be used to implement the user identifier profile system.

FIG. 6 is block diagram of an example computer processing system 600 that can be used to generate user identifier profile data and select advertisements based on the user identifier profile data. The system 600 can be used to realize a variety of different types of computer devices, such as the client devices 108 or server and computer devices on which the advertising system 104 and the user identifier profile system 112 are implemented.

The system 600 includes a processor 610, a memory 620, a storage device 630, and an input/output device 640. Each of the components 610, 620, 630, and 640 can, for example, be interconnected using a system bus 680. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different implementations, the storage device 630 can, for example, include a hard disk device, an optical disk device, or some other large capacity storage device.

The input/output device 640 provides input/output operations for the system 600. In one implementation, the input/output device 640 can include one or more of a network interface devices, e.g., an Ethernet card, a serial communication device, e.g., and RS-232 port, and/or a wireless interface device, e.g., an 802.11 card. In another implementation, the input/output device can include driver devices configured to receive input data and send output data to other input/output devices, e.g., keyboard, printer and display devices 660. Other implementations, however, can also be used, such as mobile computing devices, mobile communication devices, etc.

Although an example processing system has been described in FIG. 6, embodiments of the subject matter and the functional operations described in this specification can be implemented in other digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. The computer readable medium can be a machine readable storage device, a machine readable storage substrate, a memory device, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Additionally, the logic flows and structure block diagrams described in this patent document, which describe particular methods and/or corresponding acts in support of steps and corresponding functions in support of disclosed structural means, may also be utilized to implement corresponding software structures and algorithms, and equivalents thereof. The processes and logic flows described in this specification can be performed by one or more programmable processors executing one or more computer programs to perform functions by operating on input data and generating output.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

The computing system can include clients and servers. A client and server are generally remote from each other and typically interact through a communication network. The relationship of client and server arises by virtue of computer programs running on the respective computers and having a client server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying Figures do not necessarily require the particular order shown, or sequential order, to achieve desirable results. In certain implementations, multitasking and parallel processing may be advantageous.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A computer-implemented method, comprising:
   identifying event data for a user identifier based on past user sessions associated with the user identifier, the event data specifying events that occurred during the past user sessions;
   categorizing each of the events as belonging to one or more vertical categories;
   for each vertical category, determining a user identifier interest weight for the user identifier based on the events associated with the vertical category;
   generating user identifier demographics data for the user identifier based on population demographics for each site visited during the past user sessions as specified by the event data, the population demographics for each site identifying one or more demographic features of visitors to the site;
   generating, by one or more computer processors, user identifier profile data for the user identifier based on the user identifier interest weights and the user identifier demographics data; and
   selecting advertisements for user sessions associated with the user identifier based on the user identifier profile data.

2. The method of claim 1, wherein the events include page views of web pages, advertisement click-throughs, or conversions.

3. The method of claim 2, wherein categorizing each of the events as belonging to one or more vertical categories comprises:
   categorizing each of the events as belonging to one or more vertical categories based on subject matter associated with the event and subject matter associated with the one or more vertical categories.

4. The method of claim 2, wherein for each vertical category, determining a user identifier interest weight for the user identifier based on the events that belong to the vertical category comprises:
   determining a weight of the vertical category for the web page;
   for each of the page views, generating a web page weight based on the weight of the vertical category for the web page and an inverse document frequency of the viewed web page;

for each of the advertisement click-throughs:
    identifying an advertisement of the advertisement click-through;
    determining a weight of the vertical category for the advertisement;
    identifying a landing page of the advertisement;
    determining a weight of the vertical category for the landing page;
    determining a duration with which the landing page was presented on a user device; and
    generating an advertisement click-through weight based on the weight of the vertical category for the landing page and the duration;
for each of the conversions, generating an advertisement conversion weight based on the weight of the vertical category for the landing page and a conversion weight associated with the advertisement; and
aggregating the web page weights, the weights of the vertical category for the advertisements, the advertisement click-through weights, and the advertisement conversion weights.

5. The method of claim 1, wherein a portion of the event data are associated with a publisher, and generating the user identifier profile data for the user identifier comprises:
    generating the user identifier profile data only from the portion of the event data associated with the publisher.

6. The method of claim 1, wherein the event data are based on past user sessions that occurred during a first time period, and generating user identifier profile data comprises:
    generating long-term user identifier profile data for the user identifier from the event data that are based on past user sessions that occurred during the first time period; and
    generating short-term user identifier profile data for the user identifier from the event data that are based on past user sessions that occurred during a second time period, the second time period being a most recent sub-period of the first time period.

7. The method of claim 6, wherein selecting advertisements for user sessions associated with the user identifier based on the user identifier profile data comprises:
    selecting a candidate advertisement set based on the long-term user identifier profile data; and
    adjusting a ranking order of the candidate advertisement set based on the short-term user identifier profile data.

8. The method of claim 1, wherein generating user identifier demographics data for the user identifier based on population demographics comprises:
    aggregating the population demographics for each of the sites visited during the past user sessions.

9. The method of claim 1, wherein generating user identifier profile data for the user identifier based on the user identifier interest weights and the user identifier demographics data comprises:
    determining an order of the vertical categories according to the corresponding user identifier interest weights; and
    determining a highest-ordered subset of the ordered vertical categories for use in generating the user identifier profile data, the highest-ordered subset based on the corresponding user identifier interest weights, a first threshold and a second threshold, wherein:
        the first threshold defines an upper limit for a quotient of the user identifier interest weight of a first-ordered vertical category in a subset and the user identifier interest weight of a last-ordered vertical category in the subset;
        the second threshold defines a lower limit for a quotient of the user identifier interest weight of the last-ordered vertical category in the subset and the user identifier interest weight of a next-ordered vertical category external to the subset; and
    wherein the highest-ordered subset of vertical categories are the only vertical categories used to generate the user identifier profile data.

10. The method of claim 1, comprising:
allocating profits from advertisement auctions associated with the selected advertisements based on publisher data contributions to the event data; and
wherein an amount of the profits allocated to a publisher is based on:
    a revenue paid by an auction-winning advertiser associated with an advertisement in the selected advertisements;
    a publisher revenue share percentage; and
    a publisher data contribution factor quantifying the publisher data contribution to the event data.

11. A system, comprising:
one or more data processors; and
a data storage apparatus encoded with instructions that when executed by the one or more data processors cause the one or more data processors to define:
    a user interest module configured to:
        identify event data for a user identifier based on past user sessions associated with the user identifier, the event data specifying events that occurred during the past user sessions;
        categorize each of the events as belonging to one or more vertical categories;
        for each vertical category, determine a user identifier interest weight for the user identifier based on the events associated with the vertical category;
    a user demographics module configured to:
        generate user identifier demographics data for the user identifier based on population demographics for each site visited during the past user sessions as specified by the event data, the population demographics for each site identifying one or more demographic features of visitors to the site;
    a user profile module configured to:
        generate user identifier profile data for the user identifier based on the user identifier interest weights and the user identifier demographics data; and
    an advertisement selection module configured to:
        select advertisements for user sessions associated with the user identifier based on the user identifier profile data.

12. The system of claim 11, wherein the events include page views of web pages, advertisement click-throughs, or conversions.

13. The system of claim 12, wherein the user interest module is configured to:
    categorize each of the events as belonging to one or more vertical categories based on subject matter associated with the event and subject matter associated with the one or more vertical categories.

14. The system of claim 12, wherein the user interest module is configured to:
    determine a weight of the vertical category for the web page;
    for each of the page views, generate a web page weight based on the weight of the vertical category for the web page and an inverse document frequency of the viewed web page;

for each of the advertisement click-throughs:
  identify an advertisement of the advertisement click-through;
  determine a weight of the vertical category for the advertisement;
  identify a landing page of the advertisement;
  determine a weight of the vertical category for the landing page;
  determine a duration with which the landing page was presented on a user device; and
  generate an advertisement click-through weight based on the weight of the vertical category for the landing page and the duration;
for each of the conversions, generate an advertisement conversion weight based on the weight of the vertical category for the landing page and a conversion weight associated with the advertisement; and
aggregate the web page weights, the weights of the vertical category for the advertisements, the advertisement click-through weights, and the advertisement conversion weights.

15. The system of claim 11, wherein a portion of the event data are associated with a publisher, and the user profile module is configured to:
  generate the user identifier profile data only from the portion of the event data associated with the publisher.

16. The system of claim 11, wherein the event data are based on past user sessions that occurred during a first time period, and the user profile module is configured to:
  generate a long-term user identifier profile data for the user identifier from the event data that are based on past user sessions that occurred during the first time period; and
  generate a short-term user identifier profile data for the user identifier from the event data that are based on past user sessions that occurred during a second time period, the second time period being a most recent sub-period of the first time period.

17. The system of claim 16, wherein the advertisement selection module is configured to:
  select a candidate advertisement set based on the long-term user identifier profile data; and
  adjust a ranking order of the candidate advertisement set based on the short-term user identifier profile data.

18. A computer program product, encoded on one or more memory devices, including instructions that when executed by one or more data processing apparatuses cause the one or more data processing apparatuses to perform operations comprising:
  identifying event data for a user identifier based on past user sessions associated with the user identifier, the event data specifying events that occurred during the past user sessions;
  categorizing each of the events as belonging to one or more vertical categories;
  for each vertical category, determining a user identifier interest weight for the user identifier based on the events associated with the vertical category;
  generating user identifier demographics data for the user identifier based on population demographics for each site visited during the past user sessions as specified by the event data, the population demographics for each site identifying one or more demographic features of visitors to the site;
  generating user identifier profile data for the user identifier based on the user identifier interest weights and the user identifier demographics data; and
  selecting advertisements for user sessions associated with the user identifier based on the user identifier profile data.

19. The computer program product of claim 18, wherein the events include page views of web pages, advertisement click-throughs, or conversions.

20. The computer program product of claim 19, wherein categorizing each of the events as belonging to one or more vertical categories comprises:
  categorizing each of the events as belonging to one or more vertical categories based on subject matter associated with the event and subject matter associated with the one or more vertical categories.

* * * * *

UNITED STATES PATENT AND TRADEMARK OFFICE
CERTIFICATE OF CORRECTION

PATENT NO. : 8,352,319 B2  
APPLICATION NO. : 12/401345  
DATED : January 8, 2013  
INVENTOR(S) : Xuefu Wang et al.

Page 1 of 1

It is certified that error appears in the above-identified patent and that said Letters Patent is hereby corrected as shown below:

Title Page, Item (56), (Other Publications) line 2 – delete "Strategy. "" and insert
-- Strategy." --, therefor.

Title Page, Item (56), (Other Publications) line 4 – delete "12/402/436" and insert
-- 12/402,436 --, therefor.

Signed and Sealed this
Second Day of April, 2013

Teresa Stanek Rea
*Acting Director of the United States Patent and Trademark Office*